United States Patent [19]
Berkeley et al.

[11] Patent Number: 5,607,627
[45] Date of Patent: Mar. 4, 1997

[54] SPIN DISK HUMIDIFIER

[76] Inventors: James E. Berkeley, 28 Summer Place Cir., Hattiesburg, Miss. 39402; John A. McMillan, 2654 Woodacres Rd., Atlanta, Ga. 30345

[21] Appl. No.: 551,028

[22] Filed: Oct. 31, 1995

[51] Int. Cl.⁶ ........................................................ B01F 3/04
[52] U.S. Cl. ................................................................ 261/91
[58] Field of Search ................................................. 261/91

[56] References Cited

U.S. PATENT DOCUMENTS

| | | |
|---|---|---|
| D. 197,937 | 4/1964 | Katzman et al. . |
| D. 199,381 | 10/1964 | Katzman et al. . |
| D. 201,721 | 7/1965 | Katzman et al. . |
| D. 205,648 | 8/1966 | Katzman et al. . |
| D. 209,364 | 11/1967 | Katzman et al. . |
| D. 214,051 | 5/1969 | Katzman et al. . |
| D. 214,563 | 7/1969 | Katzman et al. . |
| D. 215,845 | 11/1969 | Katzman et al. . |
| D. 216,973 | 3/1970 | Katzman et al. . |
| D. 221,657 | 8/1971 | Katzman et al. . |
| 1,685,221 | 9/1928 | Bahnson .................................... 261/91 |
| 1,892,694 | 1/1933 | Carter ........................................ 261/91 |
| 2,028,444 | 1/1936 | Feldermann . |
| 2,163,474 | 6/1939 | Sloan . |
| 2,369,623 | 2/1945 | Utley et al. . |
| 2,766,027 | 10/1956 | Herr . |
| 2,804,870 | 9/1957 | Chelini . |
| 2,810,167 | 10/1957 | Parks, Sr. . |
| 2,984,464 | 5/1961 | Herr . |
| 3,005,591 | 10/1961 | Bradley . |
| 3,110,748 | 11/1963 | Myklebust . |
| 3,130,245 | 4/1964 | Banks . |
| 3,130,246 | 4/1964 | Banks . |
| 3,152,240 | 10/1964 | Scott . |
| 3,155,746 | 11/1964 | Banks . |
| 3,229,450 | 1/1966 | Stern . |
| 3,282,574 | 11/1966 | DePas . |
| 3,283,478 | 11/1966 | Katzman et al. . |
| 3,290,021 | 12/1966 | Blachly et al. . |
| 3,319,046 | 5/1967 | Katzman et al. . |
| 3,342,466 | 9/1967 | Flury . |
| 3,348,821 | 10/1967 | Martin et al. . |
| 3,351,737 | 11/1967 | Katzman et al. . |
| 3,365,181 | 1/1968 | Schwaneke . |
| 3,420,509 | 1/1969 | Katzman et al. . |
| 3,480,001 | 11/1969 | Katzman et al. . |
| 3,495,583 | 2/1970 | Katzman et al. . |
| 3,605,385 | 9/1971 | Stoop . |
| 3,610,879 | 10/1971 | Katzman et al. . |
| 3,687,424 | 8/1972 | Katzman et al. . |
| 3,705,415 | 12/1972 | Katzman et al. . |
| 3,714,391 | 1/1973 | Katzman et al. . |
| 3,714,392 | 1/1973 | Katzman et al. . |
| 3,905,786 | 9/1975 | Jorgensen . |
| 4,087,495 | 5/1978 | Umehara . |
| 4,132,883 | 1/1979 | Grime . |
| 4,243,870 | 1/1981 | Grime et al. . |
| 4,463,248 | 7/1984 | Katzman et al. . |
| 4,604,246 | 8/1986 | Choe . |
| 4,624,806 | 11/1986 | Koszyk . |
| 4,749,389 | 6/1988 | Worwag . |

(List continued on next page.)

FOREIGN PATENT DOCUMENTS

| | | | |
|---|---|---|---|
| 647546 | 11/1928 | France | ..................................... 261/91 |
| 934871 | 6/1948 | France . | |
| 1176200 | 4/1959 | France . | |

*Primary Examiner*—Tim R. Miles
*Attorney, Agent, or Firm*—Paul D. Bangor, Jr.; Michael J. Kline; Carol I. Bordas

[57] ABSTRACT

A humidifier comprising a bucket housing, a fan for producing a flow of air between an inlet port and an outlet port defined by the humidifier, a motor having a shaft disposed within the humidifier, and an impeller assembly coupled to the shaft of the motor, the impeller assembly comprising a hollow stem extending into the bucket housing and having longitudinal ribs disposed within the stem, and a disk disposed on an upper end of the stem, the disk defining an inner annular shoulder, an outer annular shoulder, a circumferential edge and a plurality of circumferentially spaced apertures disposed between the inner and outer annular shoulders.

20 Claims, 11 Drawing Sheets

U.S. PATENT DOCUMENTS

| | | |
|---|---|---|
| 4,790,482 | 12/1988 | Won . |
| 4,833,895 | 5/1989 | Johnson . |
| 5,014,338 | 5/1991 | Glucksman . |
| 5,111,529 | 5/1992 | Glucksman . |
| 5,210,818 | 5/1993 | Wang . |
| 5,247,604 | 9/1993 | Chiu . |
| 5,292,088 | 3/1994 | Lemont . |

SPIN DISK HUMIDIFIER

FIELD OF THE INVENTION

This invention relates to an apparatus for humidification, misting or the like, and more particularly, in a preferred embodiment, to an improved spin disk for dispersing water particles of small size.

BACKGROUND OF THE INVENTION

Mechanical spin disk type humidifiers are generally known and have enjoyed commercial success due to their ability to introduce a considerable volume of water into a room without materially influencing the ambient temperature therein. Longstanding problems associated with known mechanical spin disk humidifiers which inject water droplets upwardly into a room include "spitting" and "weeping." Spitting may be defined as the falling to the floor or other surfaces of large droplets before evaporation occurs. Further, water droplets which were small enough to be lifted by the rising air column would collide with other medium-sized droplets to form large droplets which would again fall before evaporating. Weeping occurs when large water droplets form within the humidifier housing near the exhaust port and the rush of forced air egressing therefrom lifts the large water droplets out of the housing where they subsequently fall onto the top of the housing giving the appearance that the housing was weeping.

Another problem associated with known spin disk or "heatless" humidifiers, due in part to the spitting and weeping problems previously discussed, is their inability to discharge a satisfactory amount of water into the atmosphere over a given period of time. Such known spin disk humidifiers do not effectively humidify the air, especially as the air in the room becomes more humid since the larger water particles produced by known spin disk humidifiers do not readily evaporate and fall out of the air.

Thus, there is a need for an improved humidifier which consistently produces and emits a satisfactory volume of very fine water particles in order to overcome spitting, weeping and poor humidification problems associated with known spin disk humidifiers.

It is desirable, therefore, to provide an improved spin disk humidifier which atomizes and introduces into the ambient air a profusion of very fine water particles which readily evaporate before falling.

It is also desirable to provide an improved spin disk humidifier which prevents large droplets of water from forming within the housing and being carried by forced air through the discharge port.

It is further desirable to provide a spin disk humidifier in which the air flow therethrough has been maximized to propel the atomized water particles higher into the air to increase the chances that they will evaporate before falling.

SUMMARY OF THE INVENTION

The present invention accomplishes these objectives by providing a novel humidifier having an impeller assembly comprising a hollow stem extending downwardly into the water pan and having longitudinal ribs disposed within the stem, and a disk disposed on an upper end of the stem, the disk defining an inner annular shoulder, an outer annular shoulder, a circumferential edge and a plurality of circumferentially spaced apertures disposed between the inner and outer annular shoulders.

The impeller assembly of the humidifier of the present invention produces a plurality of streams of water flowing on the underside of the spin disk in the following manner. As the impeller assembly is rotated by motor, water from the pan is propelled up through the stem along the longitudinal ribs. The stream of water associated with each rib must first climb over the inner annular shoulder on the top of the spin disk. Unlike known spin disk humidifiers, the ribs are not aligned with any of the apertures in the spin disk. Instead, the ribs are positioned so that the streams of water exiting therefrom flow between the apertures in the spin disk. The flow of water then changes from a radial flow to a circumferential flow as the water hits the inner side of the outer annular shoulder until a continuous ring of water forms around and outside of the ring of circumferentially spaced apertures in the spin disk. When the width of the circumferential stream of water grows large enough, as more water flows from the ribs against the outer annular shoulder, each of the apertures in the spin disk is fed simultaneously and water drops through the apertures into a plurality of streams on the under side of the spin disk. The water from each stream is flung off the disk through a concentrically aligned comb to further atomize the water in the streams.

In alternative embodiments, the impeller assembly may comprise a spin disk which is disposed at a non-perpendicular angle with respect to the center line of the stem, or a spin disk having an undulated circumferential edge or dual spin disks. In addition, a restrictor tip may also be employed to control the rate at which the humidifier atomizes water into the atmosphere.

A better understanding of the present invention, its uses and its other objects and advantages, may be obtained from a consideration of the following detailed description of the preferred embodiments and the claims appended hereto, particularly when read in conjunction with the appended drawings, a brief description of which now follows.

BRIEF DESCRIPTION OF THE DRAWINGS

In the accompanying drawings, the preferred embodiments of the invention and preferred methods of practicing the invention are illustrated in which.

DETAILED DESCRIPTION OF THE PREFERRED EMBODIMENTS

This invention is described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, but only by the scope of the appended claims, including all equivalents thereof.

Figure 1:
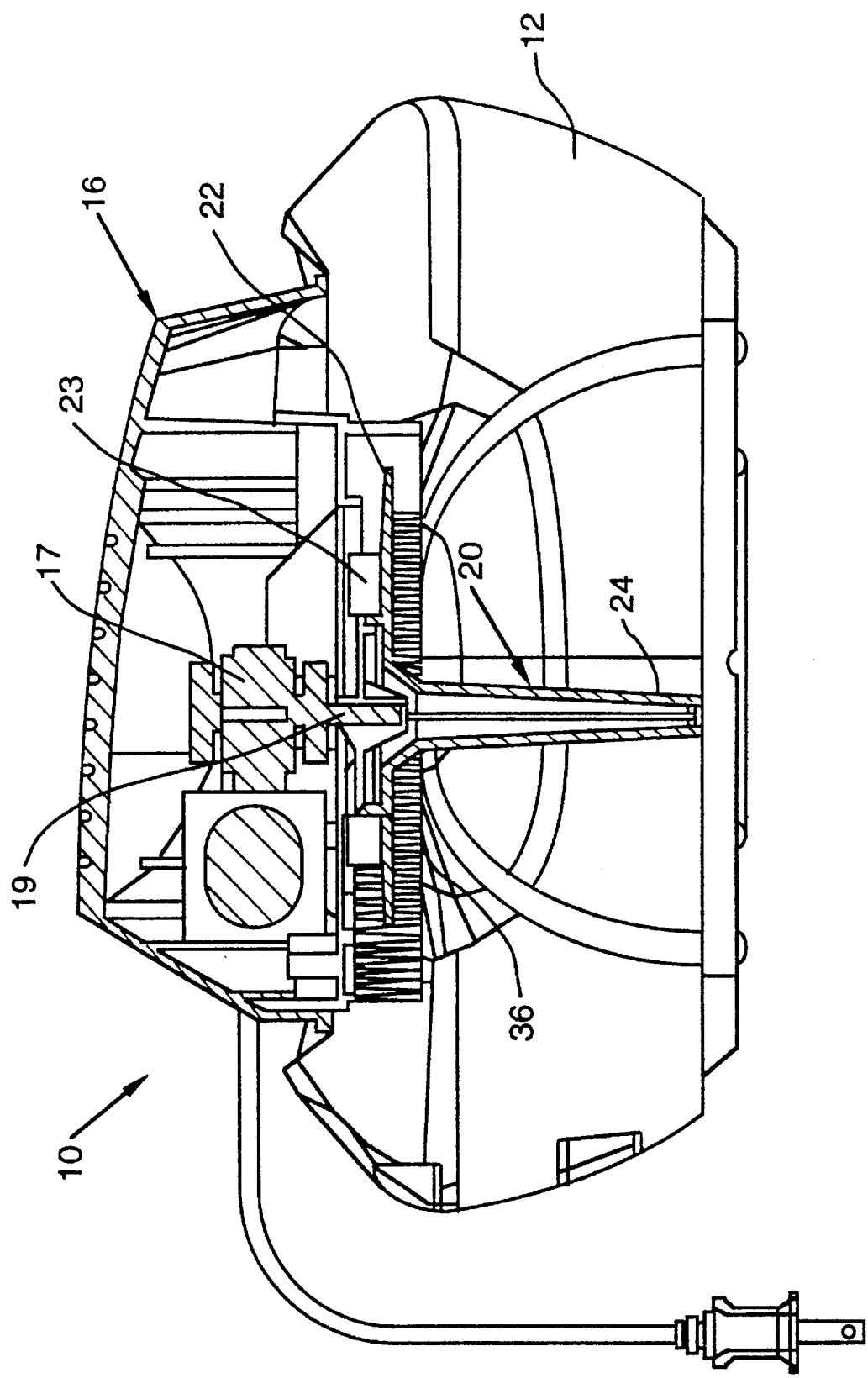
FIG. 1 is a partial cross-sectional view of the humidifier of the present invention.
Figure 1A:
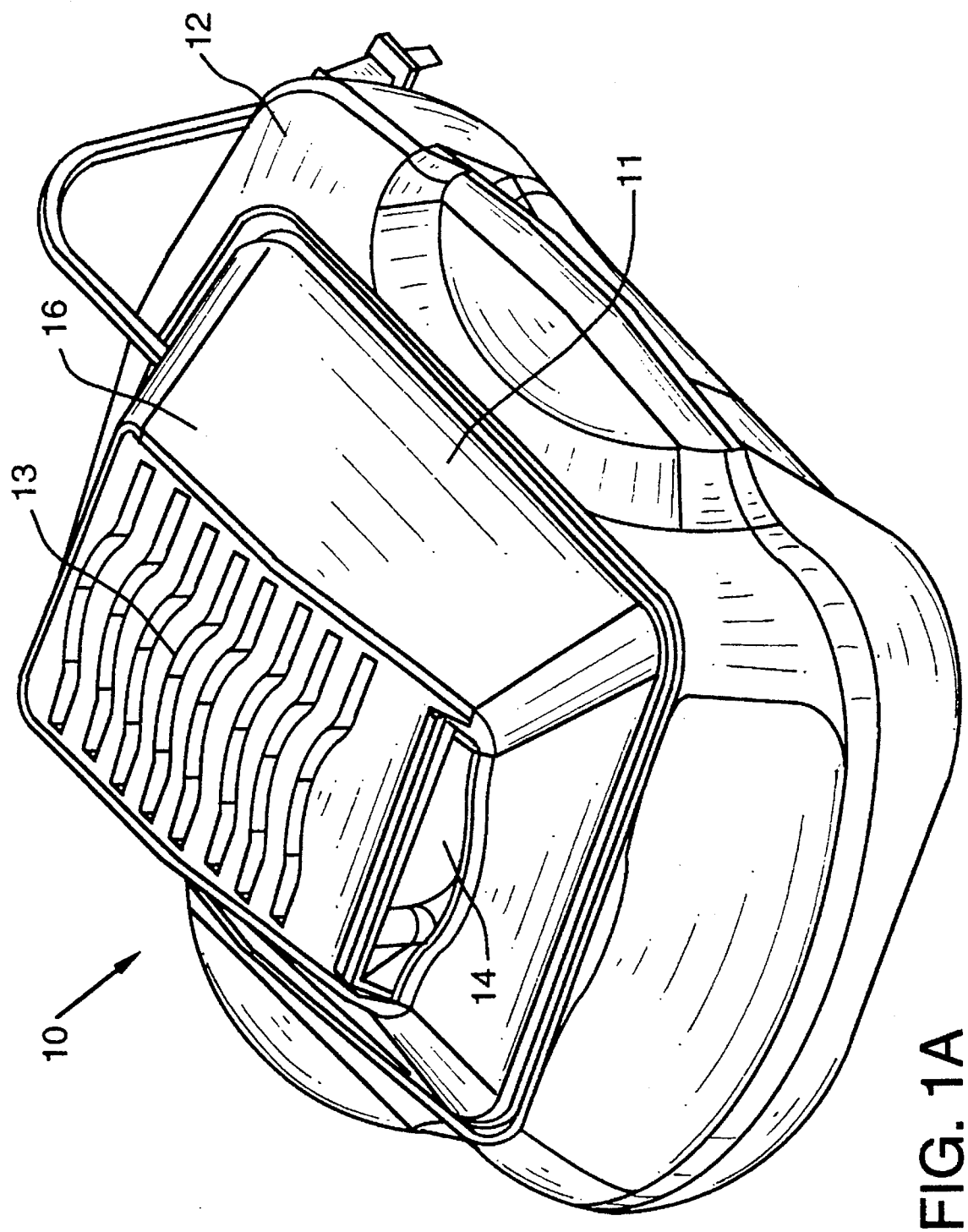
FIG. 1A is a top perspective view of the humidifier of the present invention.
Figure 2:
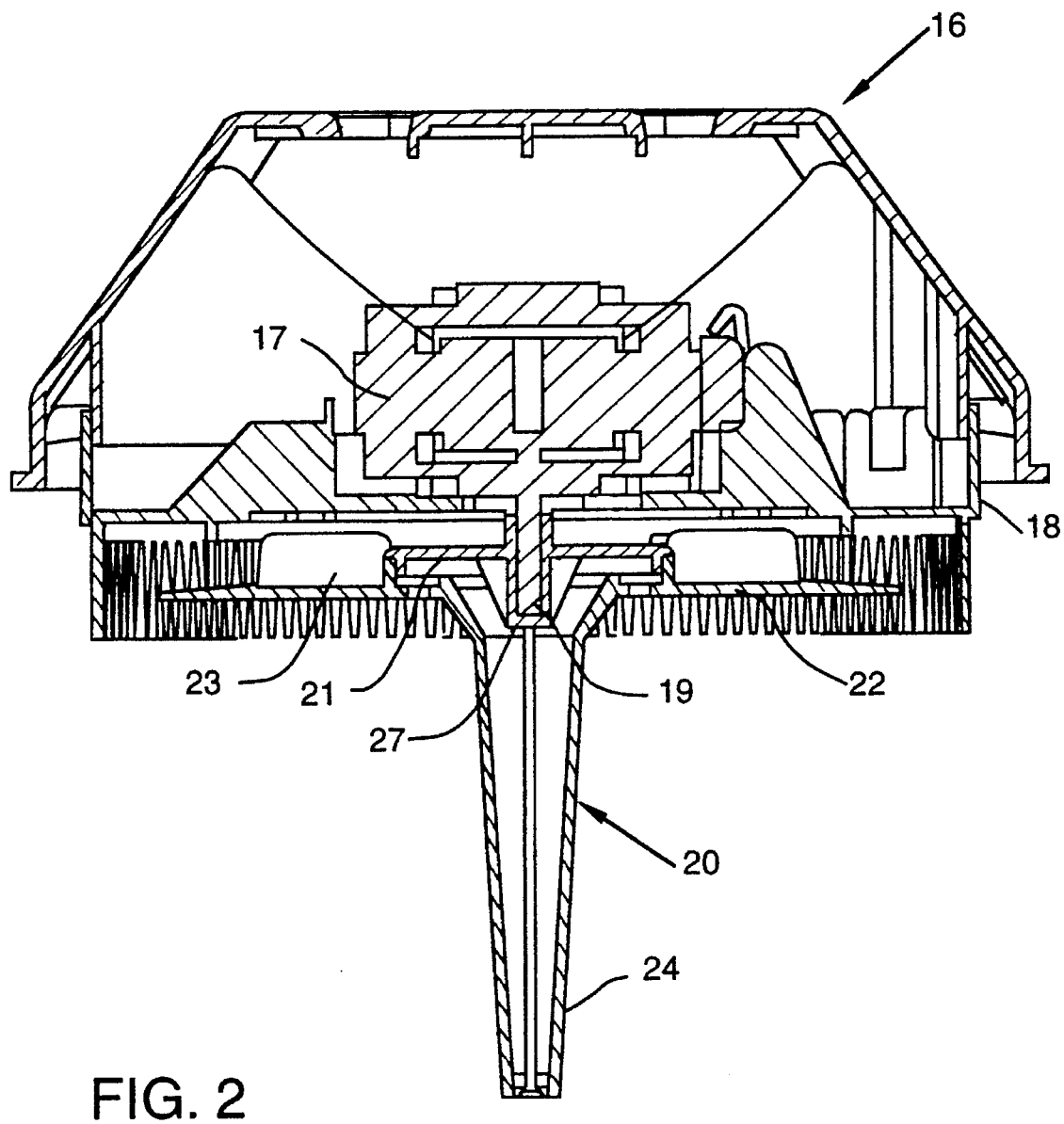
FIG. 2 is a cross-sectional view of the humidifier head assembly of the present invention with the screen partially cut away and showing the impeller assembly in cross-section.
Figure 3:
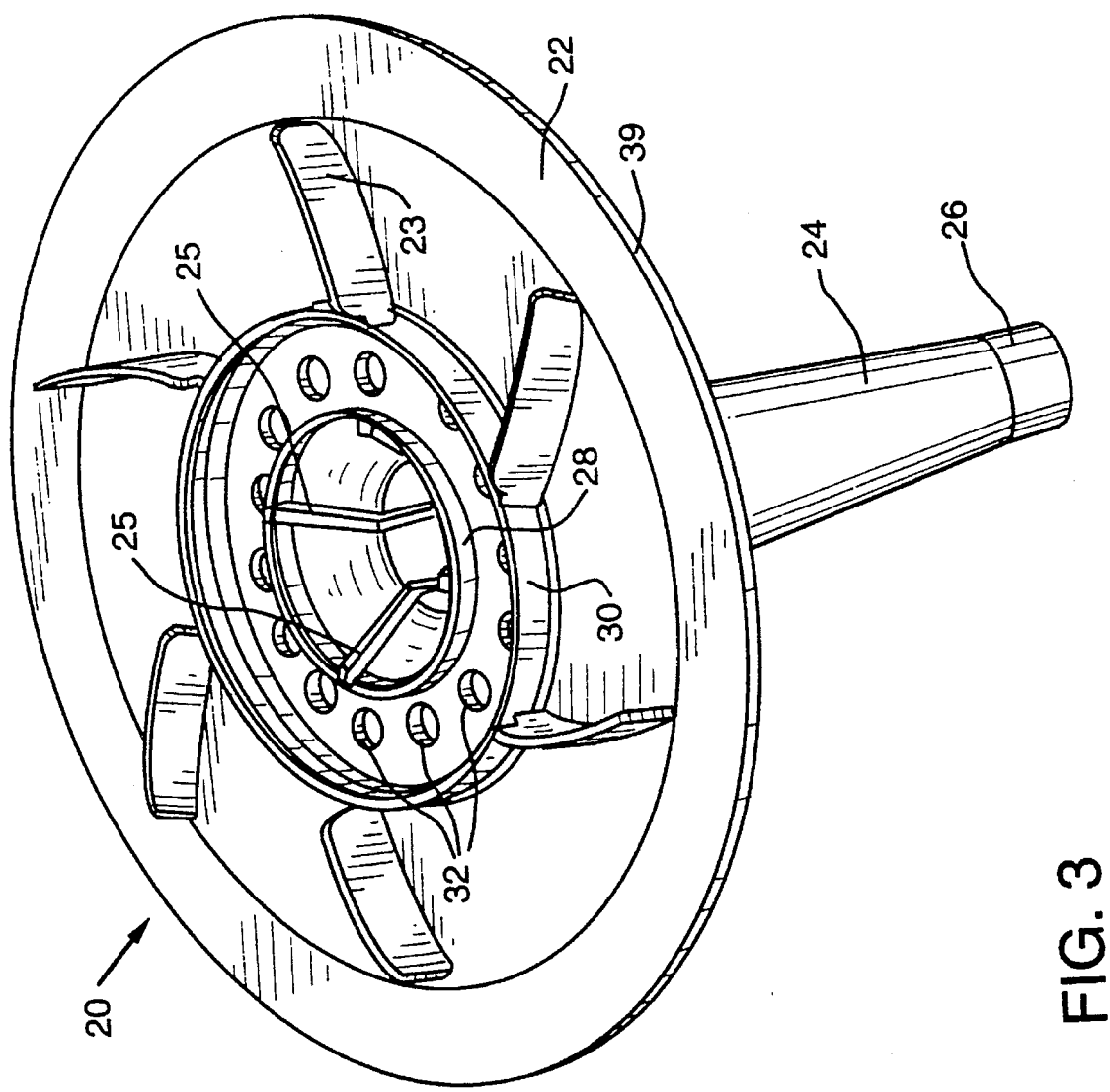
FIG. 3 is a top perspective view of the impeller assembly of the humidifier of the present invention.
Figure 3A:
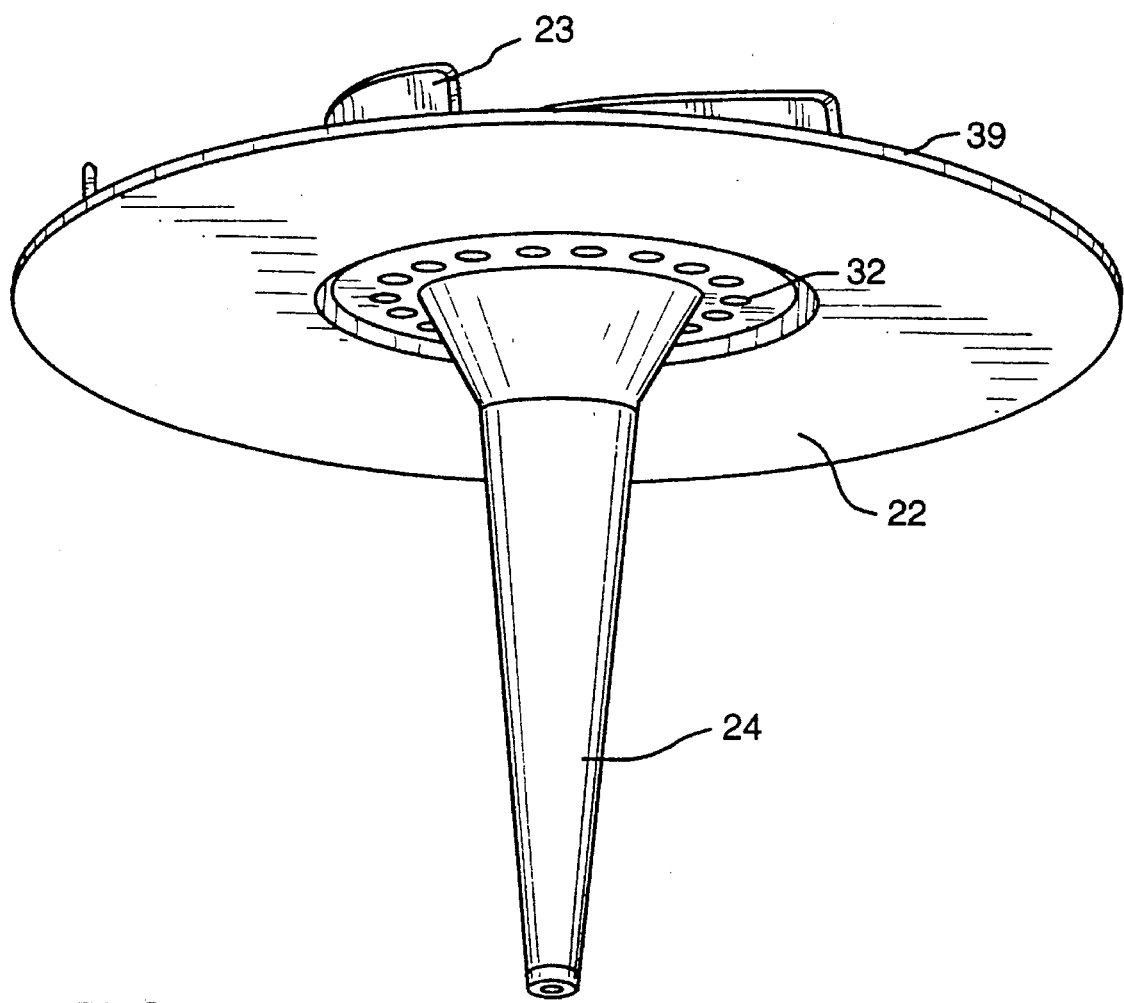
FIG. 3A is a bottom perspective view of the impeller assembly of the humidifier of the present invention.

Referring now to FIGS. 1, 1A and 2, the spin disk humidifier 10 of the present invention is shown therein comprising a humidifier head assembly 16 assembled onto a bucket housing 12 which holds the water to be atomized. The head assembly 16 further comprises a motor assembly 17 in motor housing 18 and impeller assembly 20. The impeller assembly 20 includes a cap 21 having a cylindrical cavity 27 which is press fit onto the motor shaft 19 to connect the impeller assembly 20 to the motor assembly 17. The humidifier 10 also includes a fan means for producing a flow of air between an inlet vent or port 13 and an outlet port 14 defined by the cap housing 11.

Figure 5:
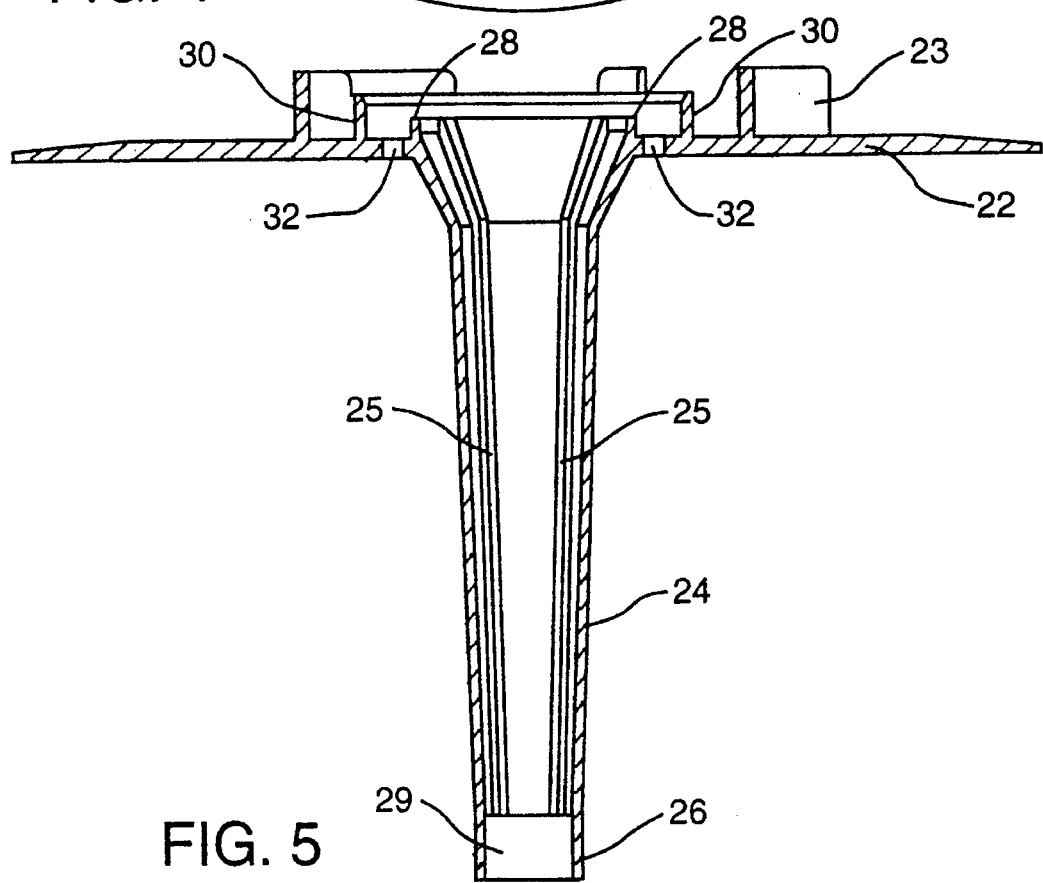
FIG. 5 is a cross-sectional view of the impeller assembly of the humidifier of the present invention along Line 5—5 of FIG. 4.
Figure 6:
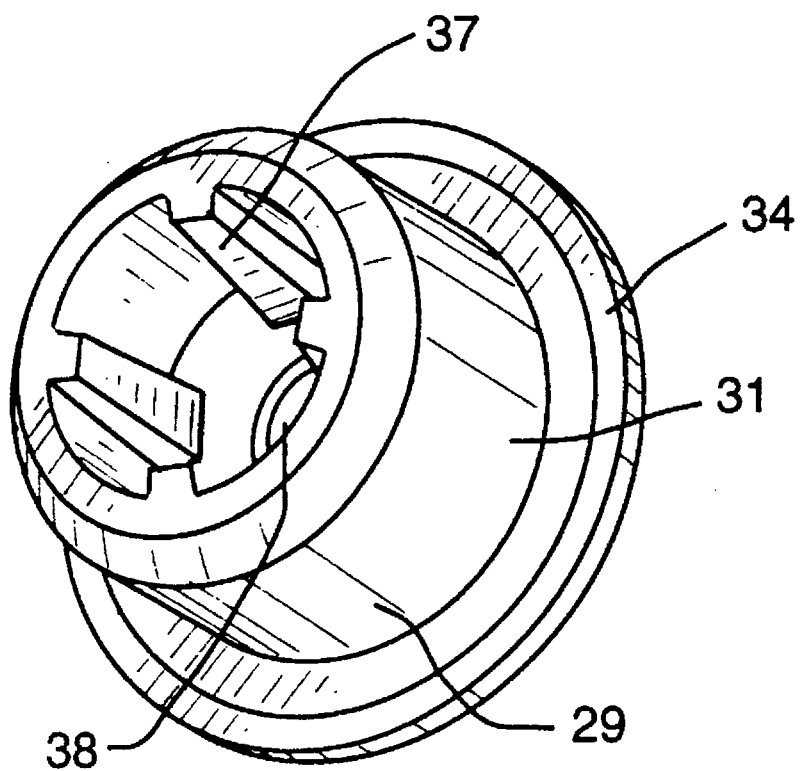
FIG. 6 is a perspective view of the restrictor tip of the humidifier of the present invention.
Figure 7:
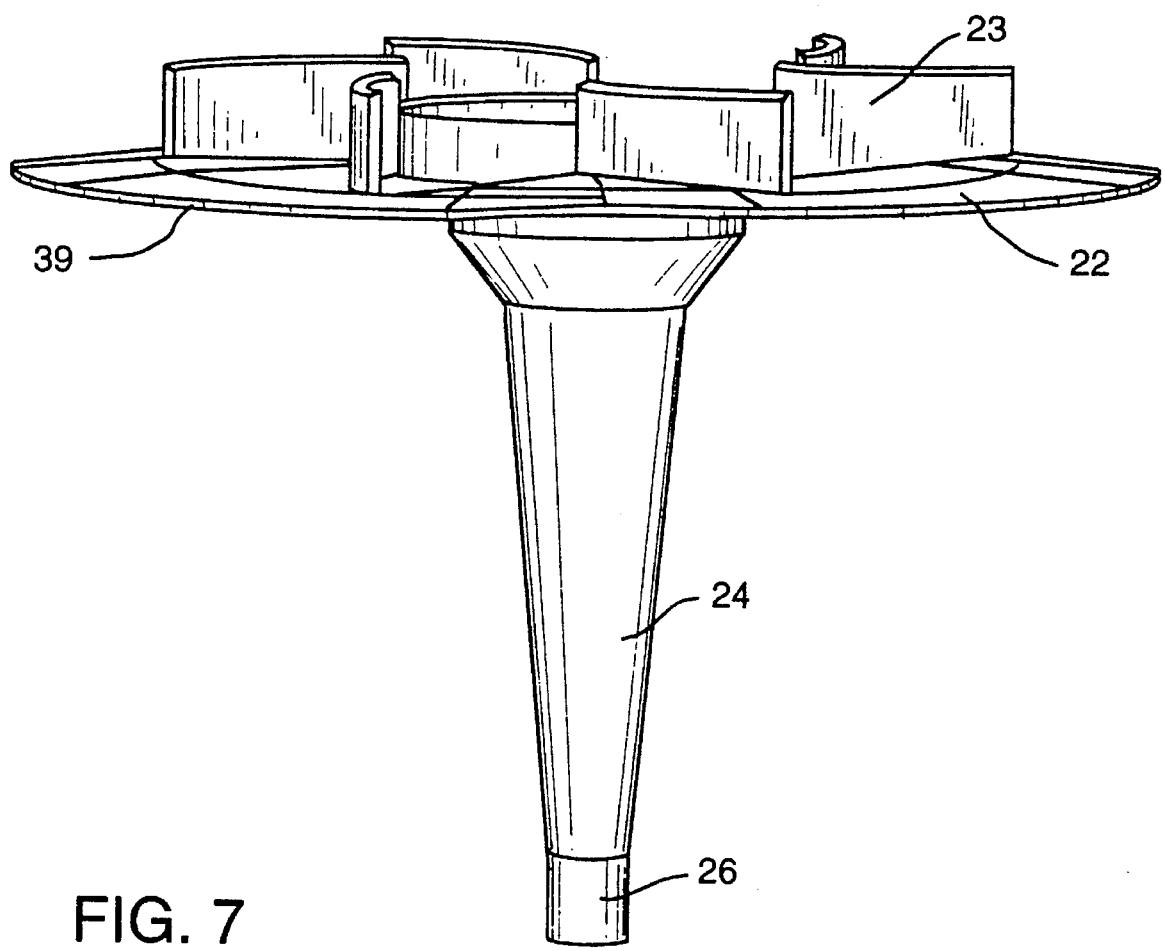
FIG. 7 is a perspective view of an alternate impeller assembly of the humidifier of the present invention having a fluted spin disk.
Figure 8:
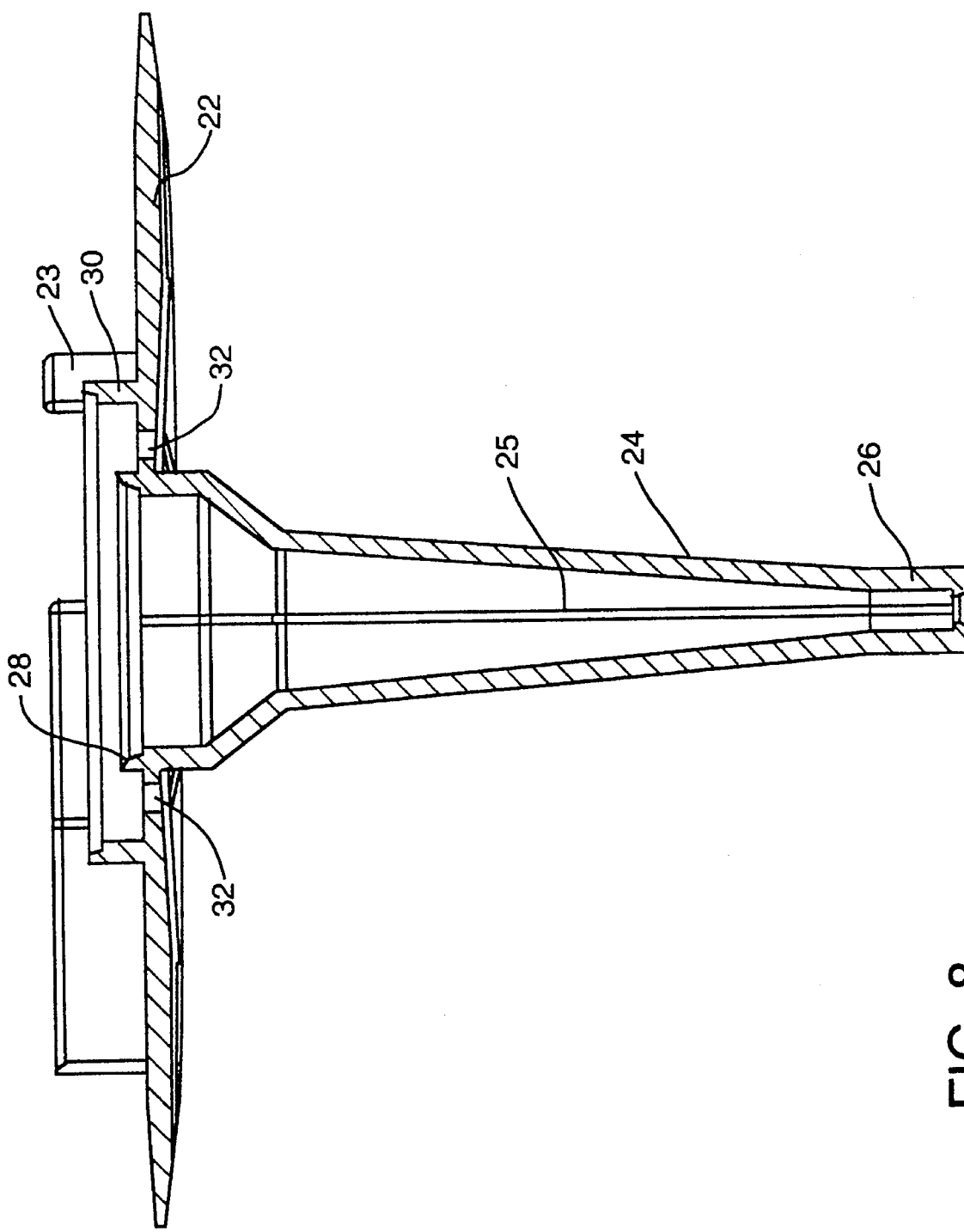
FIG. 8 is a cross-sectional view of the impeller assembly of FIG. 7.
Figure 9:
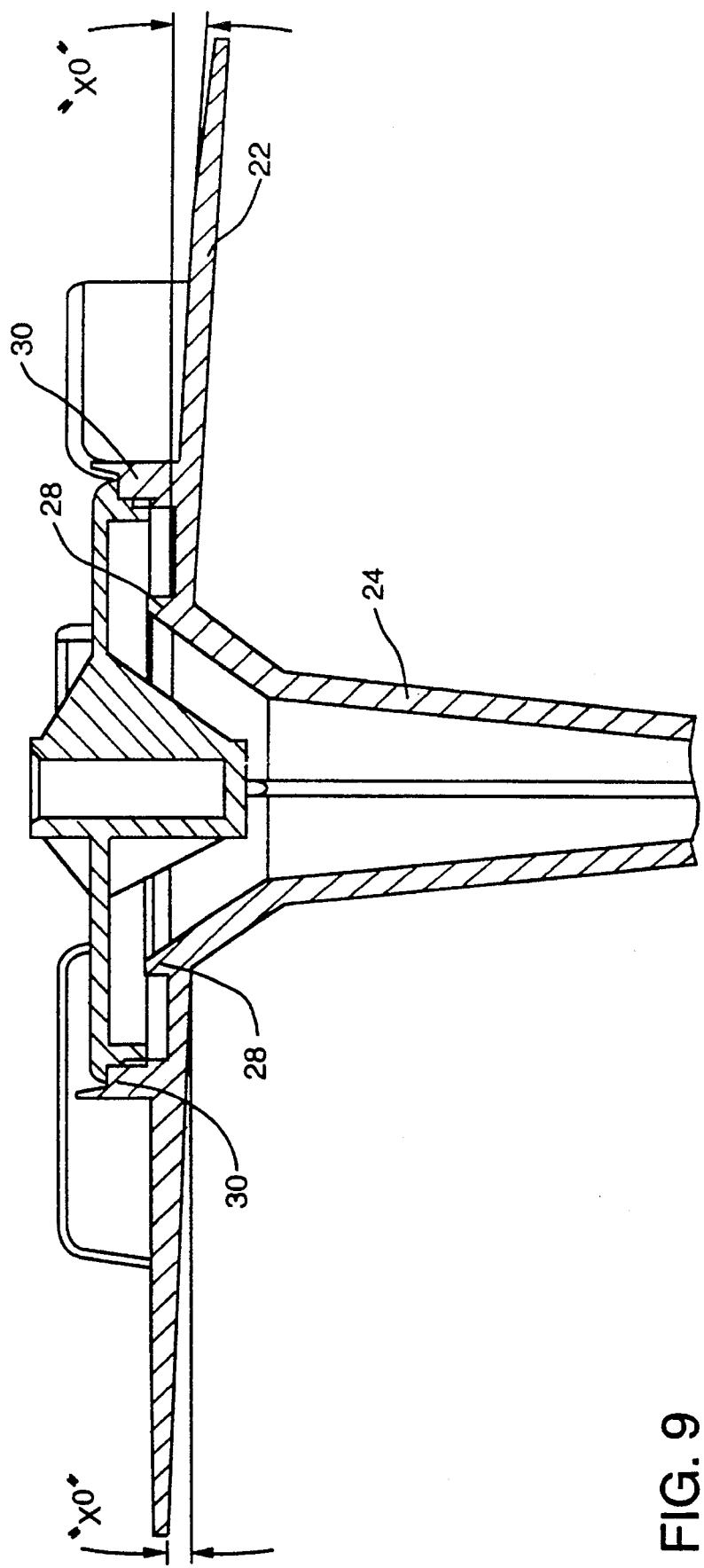
FIG. 9 is a partial cross-sectional view of yet another alternate impeller assembly of the humidifier of the present invention having the spin disk angularly disposed on the stem.

The impeller assembly 20 preferably comprises a spin disk 22 having a circumferential edge 39 and a hollow stem 24 molded as a one-piece unit. As shown in FIGS. 2 and 5, the hollow stem 24 is preferably conical in shape, the lower tip 26 of which is submerged in the bucket housing 12 of the humidifier 10. Preferably, four ribs 25 are spaced within the inside of the stem 24 and run along the entire length thereof. Any suitable number of ribs 25 may be employed, however, in accordance with the humidifier of the present invention as described herein. The spin disk 22 may preferably carry the fan blades 23 and defines a ring of apertures 32 disposed between an inner annular shoulder 28 and an outer annular shoulder 30.

Figure 4:
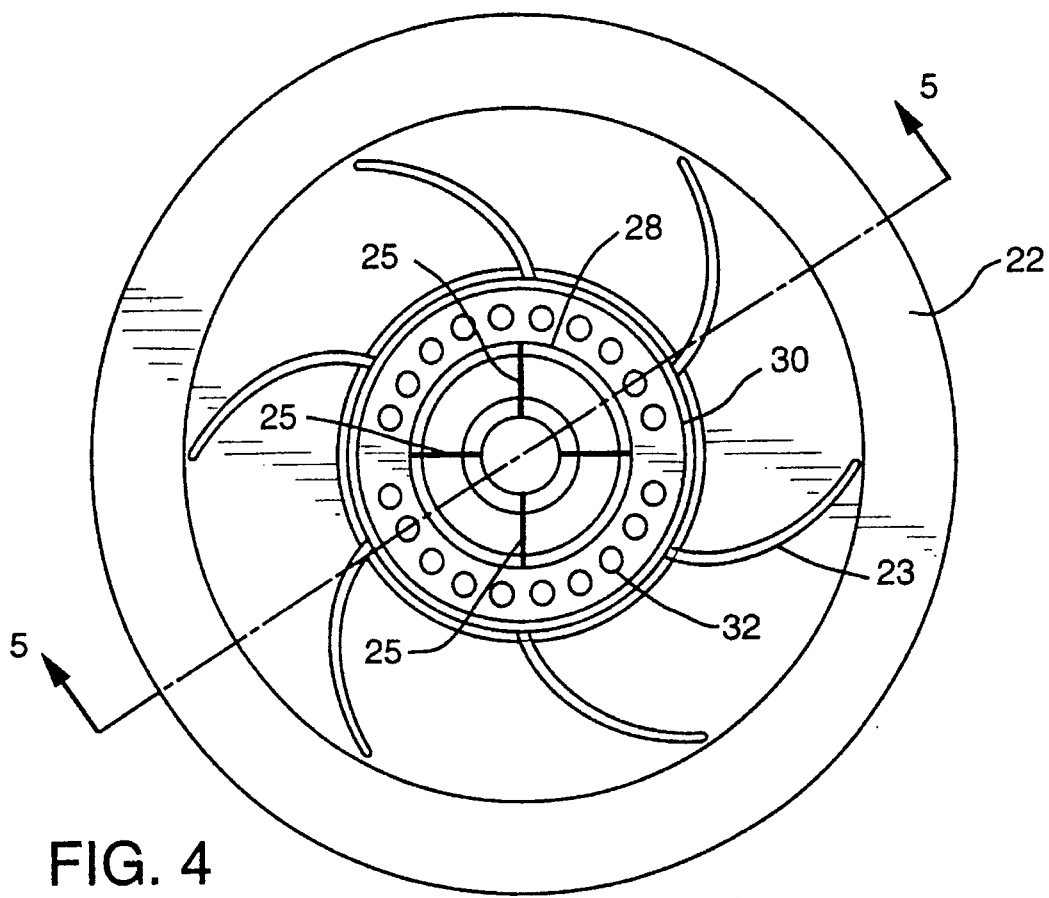
FIG. 4 is a top plan view of the impeller assembly of the humidifier of the present invention.

The impeller assembly 20 produces a plurality of streams of water flowing on the underside of the spin disk 22 in the following manner. When the impeller assembly 20 is rotated by motor 17, water from the bucket housing 12 is propelled up through the stem 24 along the four spaced ribs 25. The stream of water associated with each rib 25 must first climb over the inner annular shoulder 28 on the top of the spin disk 22. Unlike known spin disk humidifiers, the ribs 25 are not aligned with any of the apertures 32 in the spin disk 22. Instead, as shown in FIG. 4, the ribs 25 are positioned so that the streams of water exiting therefrom flow between the apertures comprising the ring of apertures 32 in the spin disk 22. The flow of water then changes from a radial flow to a circumferential flow as the water hits the inner side of the outer annular shoulder 30 until a continuous ring of water forms around and outside of the ring of apertures 32 in the spin disk 22. When the width of the circumferential stream of water grows large enough, as more water flows from the ribs 25 against the outer annular shoulder 30, each of the apertures 32 in the spin disk is fed simultaneously and water drops through the apertures 32 and is flung out in a plurality of streams on the under side of the spin disk 22.

Figure 10:
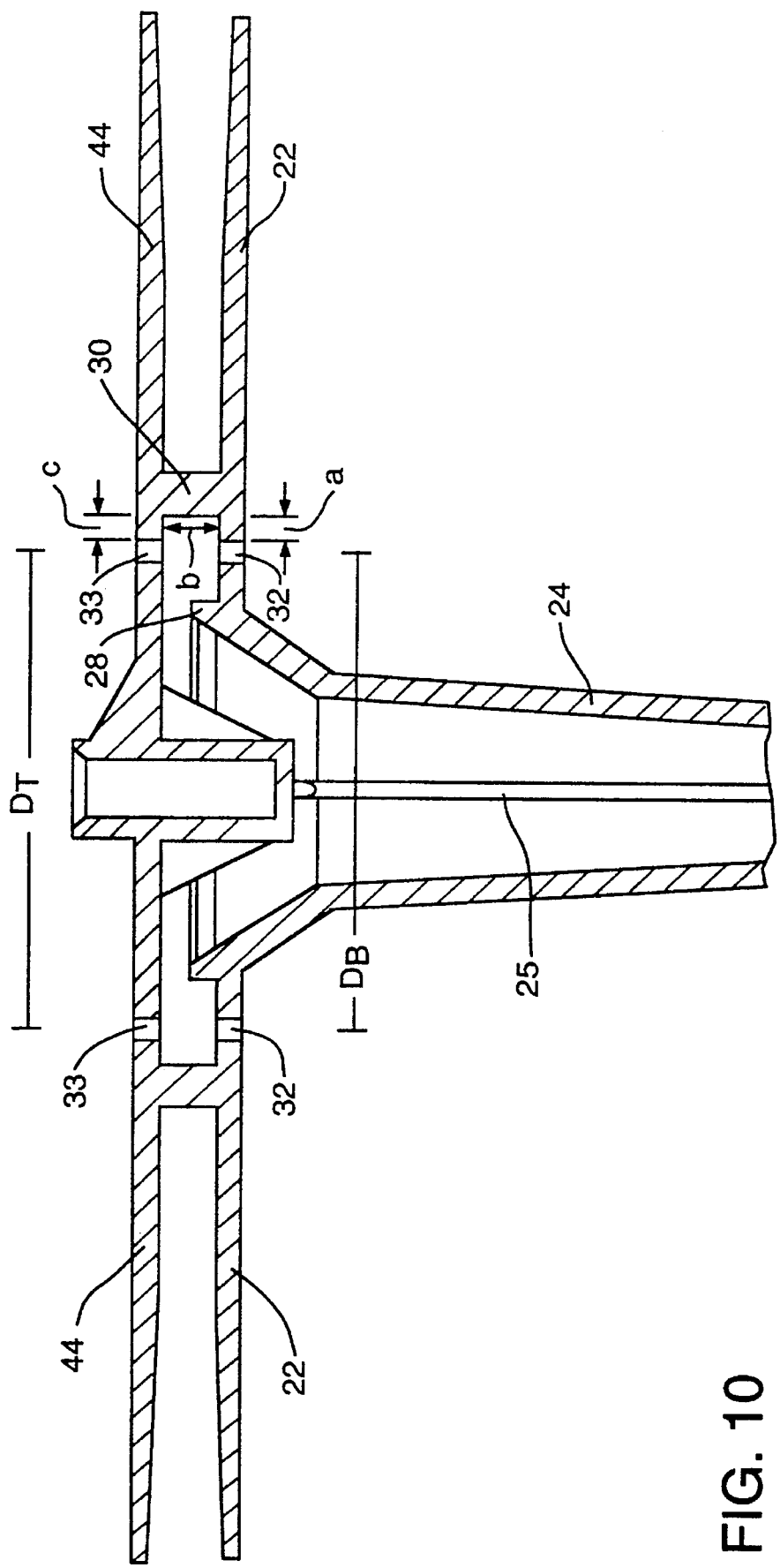
FIG. 10 is a partial cross-sectional view of still another alternate impeller assembly of the humidifier of the present invention having dual spin disks.

Because a large number of water streams are created, the particle size of the droplets flung off of the underside of the spin disk 22 by centrifugal force is smaller than the particle size achieved by known humidifiers having fewer holes in the spin disk which have been known to produce fewer and heavier streams of water which produce larger water particles.

As with known humidifiers of this type, an annular comb or screen 36 is disposed around the spin disk 22 and the water particles coming off of the spin disk 22 are further atomized when they collide with the comb 36. Because the humidifier design of the present invention produces smaller water droplets coming off of the spin disk 22, it also produces smaller water droplets exiting the comb 36.

Because the humidifier 10 of the present invention more efficiently atomizes the water in bucket housing 12, it may be desirable to slow the rate at which the water is drawn from the bucket housing 12, thereby controlling the rate at which the surrounding atmosphere is humidified by the humidifier 10. For such purpose, the lower end 26 of the impeller assembly 20 may be filled with or comprise a restrictor tip 29. As shown in FIG. 6, the restrictor tip 29 comprises a hollow cylindrical member 31, the outer diameter of which is slightly smaller than the inner diameter of the hollow stem 24 at its lower end 26 so that the cylindrical member 31 may be press fit therein. Four ribs 37 are disposed within the hollow cylindrical member 31 which function in the same manner as the ribs 25 in stem 24. An aperture 38 in the bottom of the restrictor tip 29 may be varied in size to allow the desired flow rate of water into the stem 24 of the impeller assembly 20. Preferably, the ribs 37 of the restrictor cap 29 are aligned with the ribs 25 of the stem 24. In addition, the outer diameter of flange 34 of the restrictor tip 29 is equal to the outer diameter of stem 24 at its lower end 26.

In another preferred embodiment of the humidifier 10 of the present invention, the spin disk 22 is tilted at an angle "x°" with respect to a plane which is perpendicular to the center line $C_L$ of the impeller assembly as shown in FIG. 9. The angle x° is preferably greater than 0° and up to 3° for a five inch diameter disk. Tilting the spin disk 22 produces an intentional wobble therein as the spin disk 22 rotates. Such wobble provides for the distribution of the water off the spin disk 22 in a continuously varying plane so that the water does not impact the comb 36 continuously in the same plane. As a result, more water is atomized per revolution of the spin disk 22 since there is no over-saturation of the comb 36 on a single plane.

In yet another preferred embodiment of the humidifier 10 of the present invention, the circumferential edge 39 of the spin disk 22 is not planar but instead is fluted or undulated as shown in FIGS. 7 and 8. By forming the spin disk 22 in this manner, the water flung off the disk 22 by centrifugal force will not saturate the comb 36 in one plane and more water per revolution of the spin disk 22 will be atomized into finer particles.

Furthermore, with regard to any of the preferred embodiments of the humidifier of the present invention described above, the fan blades 23 could be replaced by a separate fan unit (not shown) and a second spin disc 44 employed to increase substantially the atomization rate of the water in the bucket housing 12. FIG. 10 illustrates yet an additional preferred embodiment of the present invention where the impeller assembly 20 includes two spin disks 22 and 44. Preferably, the diameter $D_T$ of the top ring of discharge apertures 33 is greater than the diameter $D_B$ of the bottom ring of discharge apertures 32. As shown in FIG. 10, the diameters $D_T$ and $D_B$ are preferably set so that the distance "a" equals or very nearly equals the sum of the distances "b" and "c." In this manner, the water which accumulates against the inner side of the outer annular shoulder 30 will begin to flow into the apertures comprising the top and bottom rings of apertures 33 and 32, respectively, at approximately the same time. In FIG. 10, the top ring or discharge apertures 33 is shown to be aligned with the bottom ring of discharge apertures 32 for illustrative purposes only.

In yet additional preferred embodiments of the humidifier 10 of the present invention, the dual spin disks 22 and 44 may be tilted with respect the center line $C_L$ of the impeller assembly 20 as described above. Also, the dual disks 22 and 44 may be fluted or undulated as is also described above.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

We claim:

1. A humidifier comprising a bucket housing, fan means for producing a flow of air between an inlet port and an outlet port defined by the humidifier, a motor having a shaft disposed within the humidifier, and an impeller assembly coupled to the shaft of the motor, the impeller assembly comprising a hollow stem extending into the bucket housing, at least one longitudinal rib disposed within the stem, and a disk disposed on an upper end of the stem, the disk defining an inner annular shoulder, an outer annular shoulder, a circumferential edge and a plurality of circumferentially spaced apertures disposed between the inner and outer annular shoulders.

2. The humidifier of claim 1 wherein each of the at least one longitudinal rib extends between a lower end of the stem and the upper end of the stem.

3. The humidifier of claim 1 wherein the circumferential edge of the disk is undulated.

4. The humidifier of claim 1 further comprising an annular comb in alignment with at least a portion of the circumferential edge of disk.

5. The humidifier of claim 1 further comprising a restrictor tip disposed on a lower end of the stem.

6. The humidifier of claim 1 wherein each of the at least one longitudinal rib has an upper section disposed on the inner annular shoulder and is aligned with a space between two successive apertures of the plurality of circumferentially spaced apertures.

7. The humidifier of claim 6 wherein the fan means comprises a plurality of fan blades disposed on an upper surface of the disk.

8. The humidifier of claim 6 further comprising an annular comb in concentric alignment with at least a portion of the circumferential edge of the disk.

9. The humidifier of claim 8 wherein the circumferential edge of the disk is undulated.

10. The humidifier of claim 8 wherein the disk is disposed at an angle other than 90° with respect to a center line of the stem.

11. The humidifier of claim 10 wherein the circumferential edge of the disk is undulated.

12. The humidifier of claim 10 wherein the angle x° between the disk and a horizontal plane perpendicular to the center line of the stem is greater than 0° but less than or equal to about 3°.

13. A humidifier comprising a bucket housing, fan means for producing a flow of air between an inlet port and an outlet port defined by the humidifier, a motor having a shaft disposed within the humidifier, and an impeller assembly coupled to the shaft of the motor, the impeller assembly comprising a hollow stem extending into the bucket housing, a plurality of longitudinal ribs disposed within the stem, a first disk disposed on an upper end of the stem, the first disk defining an inner annular shoulder, an outer annular shoulder, a first circumferential edge and a first ring of spaced apertures disposed between the inner and outer annular shoulders, and a second disk disposed on the outer annular shoulder above the first disk, the second disk defining a second ring of spaced apertures and a second circumferential edge.

14. The humidifier of claim 13 wherein the longitudinal ribs extend between a lower end of the stem and the upper end of the stem.

15. The humidifier of claim 13 wherein each of the plurality of longitudinal ribs has an upper section disposed on the inner annular shoulder and is aligned with a space between two successive apertures of the first ring of spaced apertures.

16. The humidifier of claim 13 further comprising an annular comb in concentric alignment with at least a portion of each of the first and second disks.

17. The humidifier of claim 13 wherein the first and second disks are disposed at angles other than 90° with respect to a center line of the stem.

18. The humidifier of claim 13 wherein the diameter of the second ring of spaced apertures is greater than the diameter of the first ring of spaced apertures.

19. The humidifier of claim 13 wherein the first and second circumferential edges are undulated.

20. The humidifier of claim 13 further comprising a restrictor tip disposed on a lower end of the stem.

* * * * *